UNITED STATES PATENT OFFICE.

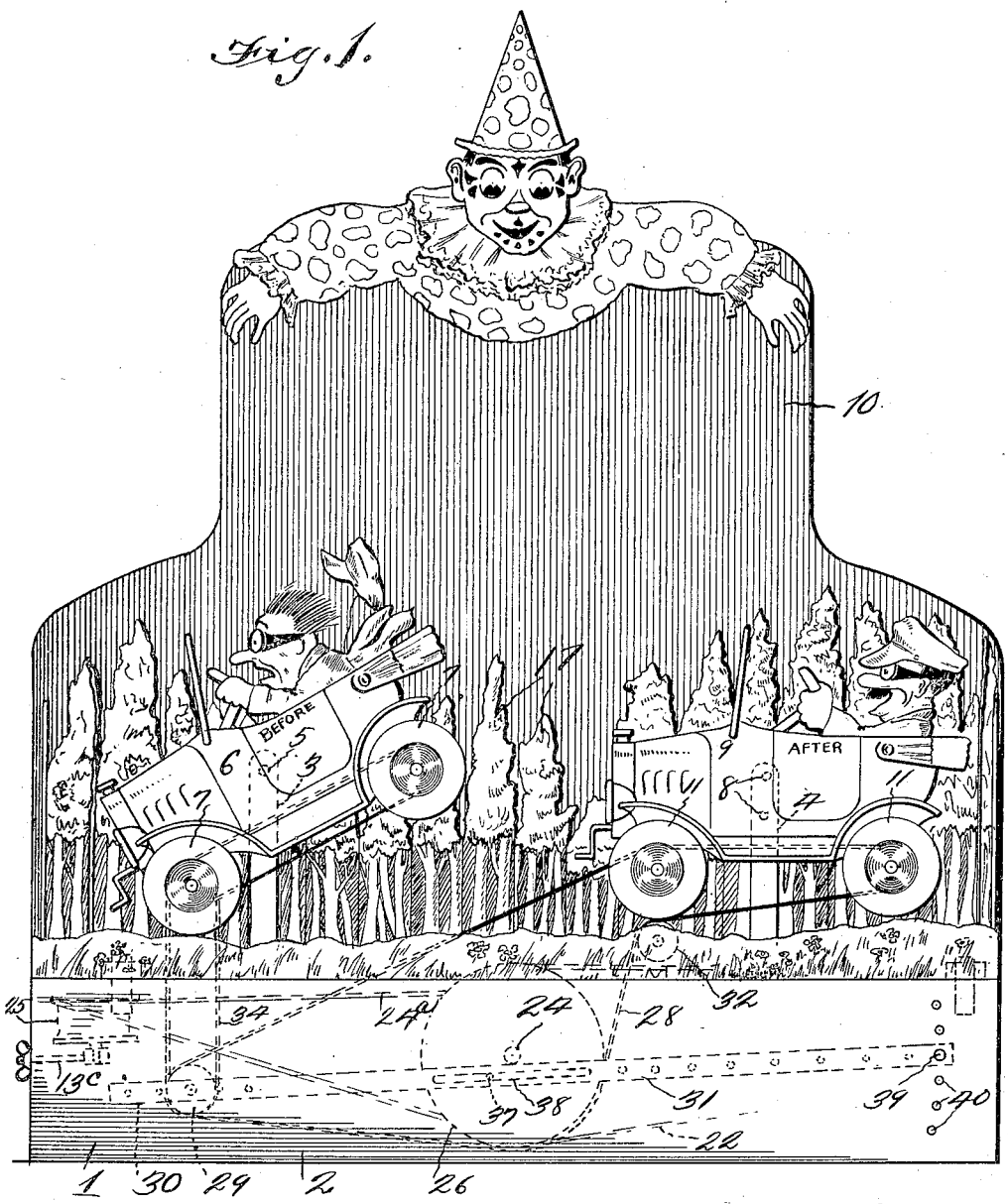

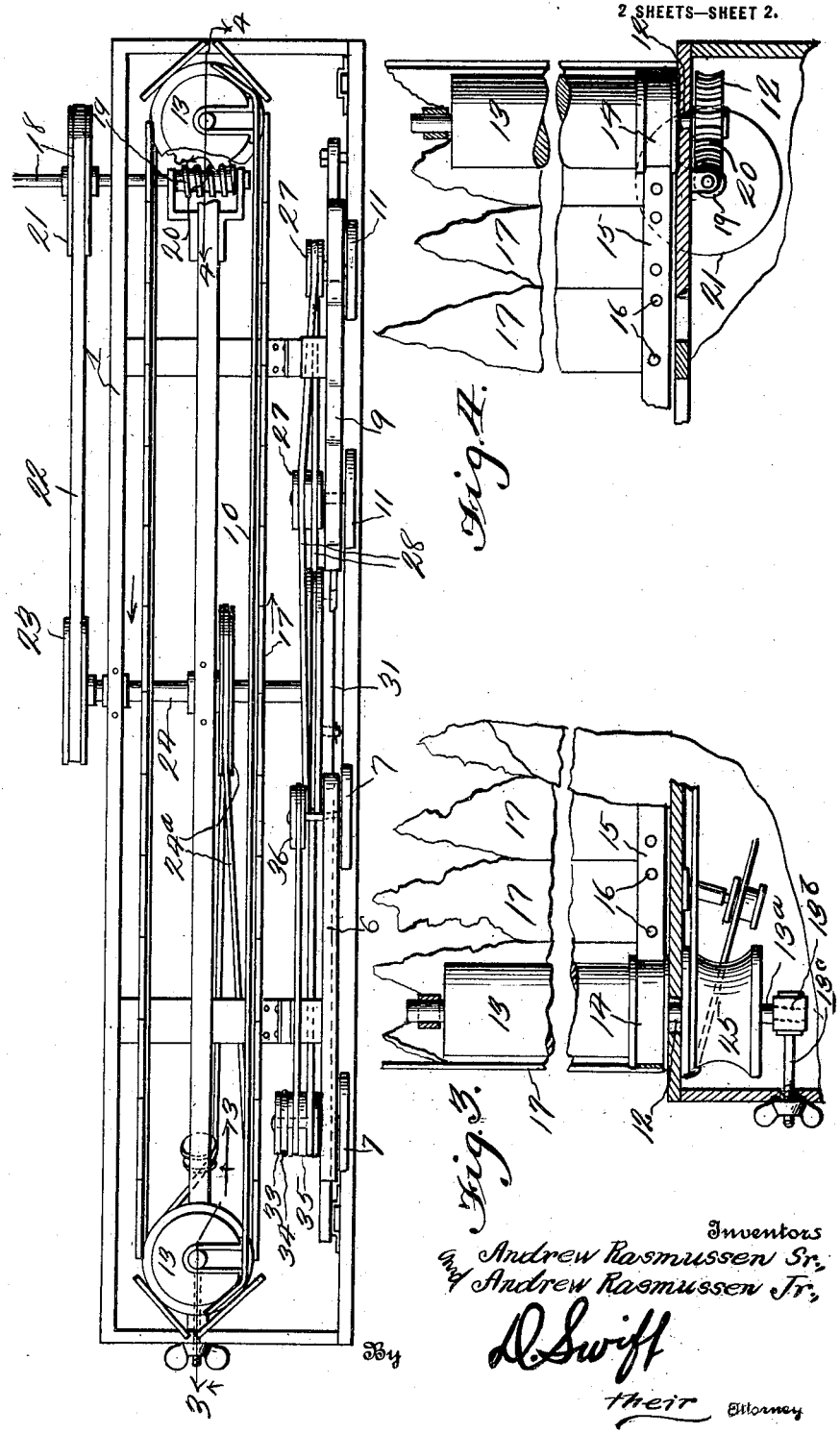

ANDREW RASMUSSEN, SR., AND ANDREW RASMUSSEN, JR., OF RIDGWAY, COLORADO.

ADVERTISING DEVICE.

1,375,261.  Specification of Letters Patent.  Patented Apr. 19, 1921.

Application filed October 14, 1920. Serial No. 417,042.

*To all whom it may concern:*

Be it known that we, ANDREW RASMUSSEN, Sr., and ANDREW RASMUSSEN, Jr., citizens of the United States, residing at Ridgway, in the county of Ouray, State of Colorado, have invented a new and useful Advertising Device; and we do hereby declare the following to be a full, clear, and exact description of the invention, such as will enable others skilled in the art to which it appertains to make and use the same.

The invention relates to advertising devices and has for its object to provide a device of this character, wherein an endless screen is moved longitudinally across the device, which screen has thereon scenes, such for instance as trees, fences and the like and to provide pivoted members, which may represent various articles, such for instance as an automobile, which pivoted members are operated from the same source of power as the longitudinally movable endless screen.

A further object is to provide a pivoted lever for oscillating the pivoted figures, said pivoted lever being oscillated by means of an eccentrically disposed pin carried by a rotatable pulley, said pin being disposed in an elongated slot of the pivoted lever so that as the pulley rotates the pivoted lever will be oscillated. Also to provide adjusting means whereby the pivotal point of the lever may be varied for varying the inclination of the pivoted figure.

A further object is to provide the free end with a pulley, through which pulley power is transmitted by means of belting to the pivoted figures.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the advertising device.

Fig. 2 is a top plan view.

Fig. 3 is an enlarged vertical sectional view taken on line 3—3 of Fig. 2.

Fig. 4 is a vertical sectional view taken on line 4—4 of Fig. 2.

Referring to the drawings, the numeral 1 designates a rectangular shaped frame, on which frame is supported all of the mechanism of the device. Frame 1 is preferably rectangular shaped and has secured to its forward side 2 upwardly extending posts 3 and 4. Pivotally secured as at 5 to the post 3 is a figure 6, which represents an automobile, which automobile is adapted to have its wheels 7 simultaneously rotated with the oscillation of the figure upon its pivotal point 5, thereby allowing the figure to represent an exaggerated action of an automobile without shock absorbers passing over a rough road. Secured to the post 4 as at 8 is a second figure 9, which figure does not oscillate and simulates the action of an automobile going over rough ground with a preferred form of shock absorber, such an ad being used for advertising a particular brand of shock absorber, the name of which may be displayed on the background 10. Fig. 9 is also provided with pivoted wheels 11 which are simultaneously rotated through mechanism hereinafter set forth.

Rotatably mounted in bearings 12 of the frame 1 and at opposite ends thereof are rollers 13, which rollers are vertically disposed and are provided with channels 14 at their lower ends, in which channels an endless belt 15 is disposed. The belt 15 is flexible and has secured thereto as at 16, upwardly extending scene sections 17 on which sections may be painted various scenes, such for instance as trees or fences, the object being primarily to form an endless scenic movable background which continuously moves so as to create an optical illusion that the figures 6 and 9 are moving instead of the background. The endless movable screen is rotated from a drive shaft 18, which drive shaft may be driven by an electric motor or in any other suitable manner. Drive shaft 18 is rotatably mounted in bearings of the frame 1 and is provided with a worm 19, which worm meshes with a gear 20 carried by the pintle of one of the rollers 13. Drive shaft 18 is also utilized for rotating the roller 13 at the opposite end of the device, power being transmitted to said roller through the pulley 21, belt 22, the pulley 23 carried by the shaft 24, said shaft being rotatably mounted substantially centrally of the frame 1 and having a pulley and belt connection 24ᵃ with the pulley 25 carried by the lower end of the roller 13. It will be seen that as the shaft 18 rotates both rollers 13 will be simultaneously rotated thereby causing the endless scene to move longitudinally so that the figures 6 and 9 which are located in front of the same will appear to be moving to the observer.

Secured to one end of the shaft 24 is a pulley 26, and around said pulley and over pulleys 27 which rotate wheels 11 of the figure 9 a belt 28 passes, said belt also passing over a pulley 29 which is pivotally mounted in the free end 30 of a pivoted lever 31, there being an idle pulley 32 over which said belt 28 also passes. It will be seen that as the pulley 26 rotates the belt 28 will not only rotate the wheels 11 of the figure 9 but will also rotate the pulley 29, which pulley 29 is belted to the pulley 33 by means of the belt 34. Pulley 33 is formed integral with the pulley 35 carried by the shaft of the front wheel 7 of the figure 6, said pulley 35 being in turn belted to a pulley 36, which pulley is carried by the rear wheel 7 of the figure 6. Thus it will be seen that as the pulley 29 rotates, the wheels 7 of the figure 6 and the wheels 11 of the figure 9 will be simultaneously rotated.

Figure 6 is oscillated on its pivotal point 5 by means of an eccentrically mounted pin 37, which pin extends through an elongated slot 38 in the pivoted lever 31, the rear end of said pivoted lever being pivotally connected by means of a pin 39 and passes through the lever and anyone of the apertures 40 in the front side of the frame 1. Thus it will be seen that the eccentric action may be varied so that the oscillation of the figure 6 on its pivotal point 5 may also be varied, according to the type of figure used or the amount of oscillation desired. It will also be seen that during the oscillation of the figure 6 the figure 9 will remain horizontal, thereby indicating the smooth running of the automobile represented by the figure 9. It is understood though that various figures may be substituted for figures 6 and 9, for instance washing machine figures or any other figures desired will be displayed.

The pintle 13ᵃ of the roller 13 is mounted in a bearing 13ᵈ of a belt tightening device 13ᶜ, by means of which device the endless movable scene belt is tightened as desired, to prevent slipping of the same.

The invention having been set forth what is claimed as new and useful is:—

1. A device of the character described comprising an endless vertically disposed scenic belt, and a pivoted lever, a single source of power for operating the scenic belt and oscillating the pivoted lever, said lever being operable by means of an eccentrically disposed pin carried by a rotatable member, means for varying the position of the pivotal point of the lever for varying the oscillation of the lever, a pivoted figure having operable parts thereon and a fixed figure having operable parts thereon and means operable from the single source of power for operating the operable parts on the figures, said pivoted figure being oscillated on its pivotal point by the oscillation of the pivotal lever simultaneously with the operation of the operable parts thereon.

2. A device of the character described, comprising vertically disposed rollers having an endless scenic belt around the same and a pivoted lever, means operable from the same source of power for rotating the vertically disposed rollers and oscillating the pivoted lever, brackets disposed in front of the scenic belt, figures carried by said brackets and entirely supported thereby, one of said figures being pivoted, operable parts carried by the figures and means operable from the single source of power for oscillating the pivoted figure and operating the operable parts of the figures.

3. An advertising device comprising a base, an endless movable scene carried by said base, an oscillating lever disposed in the base and pivoted at one of its ends, figures supported on brackets in front of the scene provided with operable parts, one of said figures being pivoted and means operable from a single source of power whereby the scene will be moved, the operable parts of the figures operated and the pivoted figure rocked on its pivotal point incident to the oscillation of the pivoted lever.

4. A device of the character described, said device comprising vertically disposed rollers having an endless scenic belt around the same and bracket supported figures in front of the belt, one of said figures being pivoted, operable parts carried by said figures, a lever disposed below the figures and having one of its ends pivoted, means for oscillating said lever and moving the scenic belt from a single source of power, means whereby upon the oscillation of the lever the pivoted figure will be oscillated and the operable parts of both figures operated and means whereby the pivotal point of the lever may be varied.

5. A device of the character described comprising spaced figures supported on brackets, one of said figures being pivoted, operable parts carried by said figures, a pivoted lever having an adjustable pivoted point, and means operable from a single source of power for oscillating said lever, operating the operable parts of the figures and oscillating the pivoted figure on its pivotal point.

In testimony whereof we have signed our names to this specification in the presence of two subscribing witnesses.

ANDREW RASMUSSEN, Sr.
ANDREW RASMUSSEN, Jr.

Witnesses:
CARROLL M. STANWOOD,
FERN M. PORTER.